(12) United States Patent
Sherwin

(10) Patent No.: US 8,069,945 B2
(45) Date of Patent: Dec. 6, 2011

(54) METHOD AND APPARATUS FOR REAR WHEEL STEERING CONTROL

(75) Inventor: Kenneth A. Sherwin, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 610 days.

(21) Appl. No.: 12/229,679

(22) Filed: Aug. 26, 2008

(65) Prior Publication Data

US 2010/0051375 A1 Mar. 4, 2010

(51) Int. Cl.
*B62D 9/00* (2006.01)

(52) U.S. Cl. .......................................... 180/402; 180/413

(58) Field of Classification Search .................. None
See application file for complete search history.

(56) References Cited

U.S. PATENT DOCUMENTS

| | | | |
|---|---|---|---|
| 6,655,709 B2 | 12/2003 | Sherwin et al. | |
| 6,929,086 B1 * | 8/2005 | Husain et al. | 180/413 |
| 6,945,350 B2 | 9/2005 | Szabela et al. | |
| 2007/0144818 A1 | 6/2007 | Sherwin | |
| 2008/0289897 A1 * | 11/2008 | Williams | 180/402 |

* cited by examiner

*Primary Examiner* — Tony H. Winner
(74) *Attorney, Agent, or Firm* — Tarolli, Sundheim, Covell & Tummino LLP

(57) ABSTRACT

An apparatus (10) for use in turning steerable wheels of a vehicle (12) upon manual rotation of a steering wheel (14) comprises a front steering motor (36) coupled to a front steerable wheel (18) of the vehicle (12) for turning the front steerable wheel. A rear steering motor (66) is coupled to a rear steerable wheel (22) of the vehicle (12) for turning the rear steerable wheel. A position sensor (34) senses a rotational position of the steering wheel (14) and provides an output indicative of said rotational position. A controller (90) receives the output of the position sensor (34) and controls the front and rear steering motors (36, 66) to turn the front steerable wheel (22) in response to the output from the position sensor (34) indicating rotation of the steering wheel (14) in a first portion of a range of rotation of the steering wheel. The controller (90) also controls the front and rear steering motors (36, 66) to turn only the rear steerable wheel (22) in response to the output from the position sensor (34) indicating rotation of the steering wheel (14) in a second portion of the range of rotation of the steering wheel.

10 Claims, 2 Drawing Sheets

METHOD AND APPARATUS FOR REAR WHEEL STEERING CONTROL

TECHNICAL FIELD

The present invention relates to a method and apparatus for steering a vehicle and, in particular, a method and apparatus for steering a vehicle having front steerable and rear wheels.

BACKGROUND OF THE INVENTION

A known vehicle steering apparatus includes a front steering gear connected with front steerable wheels of a vehicle. Two rear steering gears are connected with rear steerable wheels of the vehicle. A position sensor determines the steering position of front steerable wheels of the vehicle. A controller controls operation of the two rear steering gears and turning of the rear steerable wheels of the vehicle. A steering apparatus having this construction is disclosed in U.S. Pat. No. 6,945,350.

Another known vehicle steering apparatus includes a front steering gear connected with front steerable wheels of a vehicle. A rear steering gear may be connected with rear steerable wheels of a vehicle. A torque sensor is connected with a steering wheel of the vehicle, and a controller is connected with the torque sensor. The torque sensor is operable to provide an output upon manual application of force to the steering wheel. The controller is operable to effect operation of the rear steering gear in response to the output from the torque sensor indicating application of at least a predetermined force to the steering wheel. A steering apparatus having this construction is disclosed in U.S. Patent Application Publication No. 2007/0144818.

SUMMARY OF THE INVENTION

The present invention is directed to a method and apparatus for steering a vehicle and, in particular, a method and apparatus for steering a vehicle having a rear steerable wheel.

In accordance with one representative embodiment of the invention, an apparatus for use in turning steerable wheels of a vehicle upon manual rotation of a steering wheel comprises a front steering motor coupled to a front steerable wheel of the vehicle for turning the front steerable wheel. A rear steering motor is coupled to a rear steerable wheel of the vehicle for turning the rear steerable wheel. A position sensor senses a rotational position of the steering wheel and provides an output indicative of the rotational position. A controller receives the output of the position sensor and controls the front and rear steering motors to turn the front steerable wheel in response to the output from the position sensor indicating rotation of the steering wheel in a first portion of a range of rotation of the steering wheel. The controller also controls the front and rear steering motors to turn only the rear steerable wheel in response to the output from the position sensor indicating rotation of the steering wheel in a second portion of the range of rotation of the steering wheel.

In accordance with a second representative embodiment of the invention, an apparatus for use in turning steerable wheels of a vehicle upon manual rotation of a steering wheel comprises a front steering gear coupled to a front steerable wheel of the vehicle for turning the front steerable wheel. A rear steering gear is coupled to a rear steerable wheel of the vehicle for turning the rear steerable wheel. A position sensor senses a rotational position of the steering wheel and provides an output indicative of the rotational position. A controller receives the output of the position sensor and controls the front and rear steering gears to turn the front steerable wheel in response to the output from the position sensor indicating rotation of the steering wheel in a first portion of a range of rotation of the steering wheel. The controller also controls the front and rear steering gears to turn only the rear steerable wheel in response to the output from the position sensor indicating rotation of the steering wheel in a second portion of the range of rotation of the steering wheel.

In accordance with a third representative embodiment of the invention, a method is provided for turning at least one front steerable wheel and at least one rear steerable wheel of a vehicle upon manual rotation of a steering wheel. The method comprises the step of sensing a rotational position of the steering wheel and providing a position output indicative of the rotational position. The method also comprises the step of turning the at least one front steerable wheel in response to the position output indicating rotation of the steering wheel in a first portion of a range of rotation of the steering wheel. The method further comprises the step of turning only the at least one rear steerable wheel in response to the position output indicating rotation of the steering wheel in a second portion of the range of rotation of the steering wheel.

BRIEF DESCRIPTION OF THE DRAWINGS

The foregoing and other features and advantages of the present invention will become apparent to one skilled in the art upon consideration of the following description of the invention and the accompanying drawings, in which.

DESCRIPTION OF EMBODIMENTS

Figure 1:
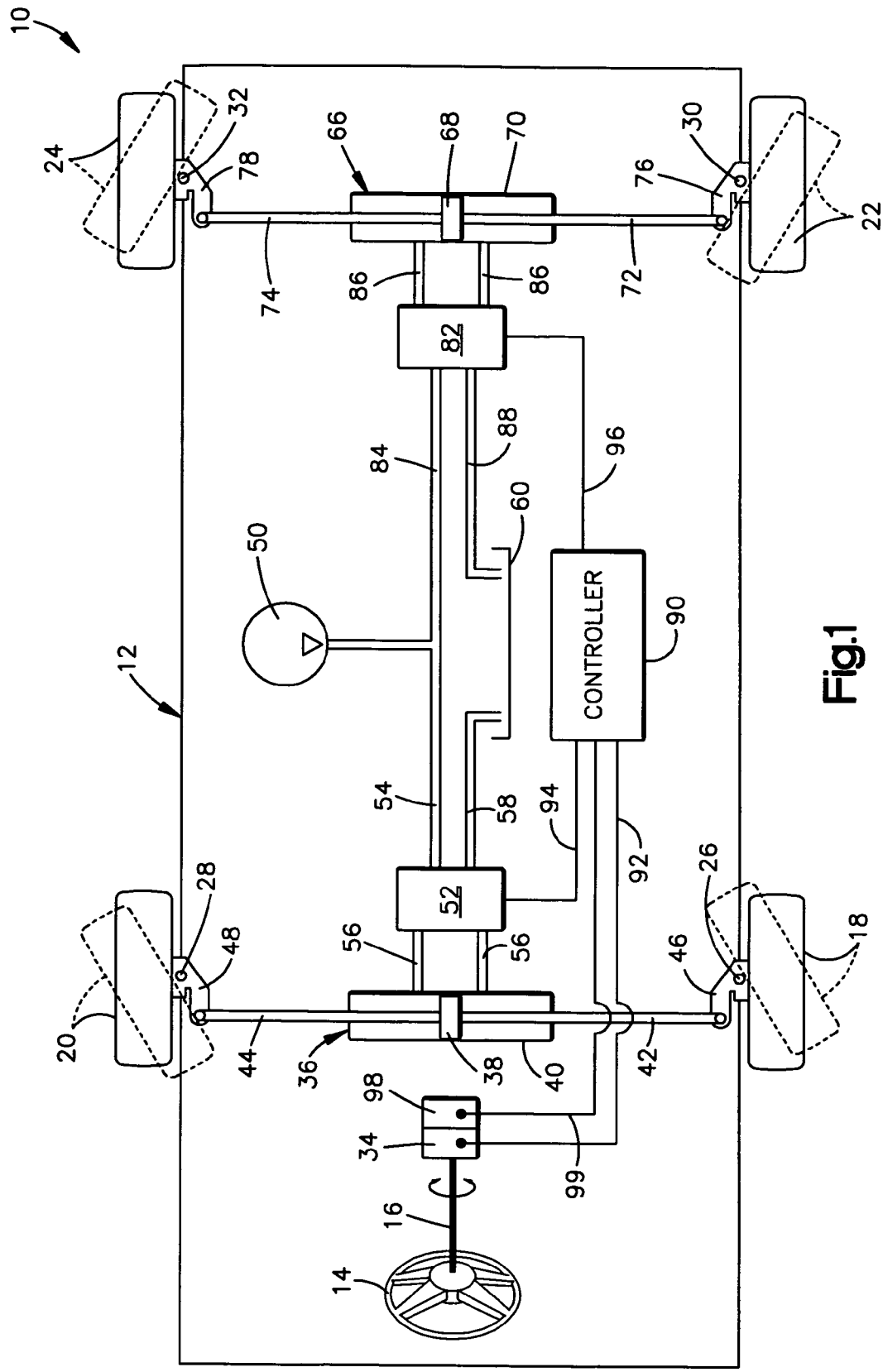
FIG. 1 is a schematic top view of a first embodiment of a steering apparatus embodying the present invention.

FIG. 1 of the drawings illustrates an apparatus 10 in accordance with an example embodiment of the present invention mounted in a vehicle 12. The vehicle 12 includes a hand wheel or steering wheel 14 mounted on a steering shaft 16. The steering wheel 14 can be manually rotated about the longitudinal axis of the steering shaft 16 by a vehicle operator to steer the vehicle 12.

The vehicle 12 also includes four road-engaging wheels 18, 20, 22 and 24. Wheels 18 and 20 are front wheels of the vehicle 12, and wheels 22 and 24 are rear wheels of the vehicle. At least one of the front wheels 18 and 20 and at least one of the rear wheels 22 and 24 is steerable. As shown in FIG. 1, all of the wheels 18, 20, 22 and 24 are steerable. Rotation of the steering wheel 14 causes the steerable wheels 18, 20, 22 and 24, via the apparatus 10, to pivot about respective pivot axes 26, 28, 30 and 32 and thereby change a direction in which the vehicle 12 is traveling.

The apparatus 10 translates rotational movement of the steering wheel 14 into pivotal movement of the steerable wheels 18, 20, 22 and 24 to change the direction of vehicle travel. The apparatus 10 includes a position sensor 34 for sensing the position of the steering wheel 14 relative to a straight-ahead or neutral position in which the steerable wheels 18, 20, 22 and 24 are oriented to cause the vehicle to travel straight ahead. The position sensor 34 provides a position output signal indicative of the extent to which the steering wheel 14 is turned from a straight-ahead or neutral position, such as the angular position of the steering wheel relative to the neutral position. The position sensor 34 may be any suitable known sensor.

The apparatus 10 also includes a front steering motor 36 for turning the front steerable wheels 18 and 20. The front steering motor 36 is a hydraulic steering motor and includes a piston 38 disposed in and movable along the length of a cylinder 40. Piston rods 42 and 44 are connected to opposite sides or ends of the piston 38. The piston rods 42 and 44 extend through opposite ends of the cylinder 40 and are connected to spindles 46 and 48, respectively. Spindles 46 and 48, in turn, are connected to front steerable wheels 18 and 20, respectively, such that the spindles pivot with the wheels about their respective pivot axes 26 and 28. The front steering motor 36 is thus coupled to the front steerable wheels 18 and 20 of the vehicle 12 to turn the front steerable wheels.

Piston 38 effectively divides the interior of cylinder 40 into two variable volume chambers on opposite sides of the piston. Introducing pressurized hydraulic fluid into one of the variable volume chambers and permitting hydraulic fluid to flow out of the other of the variable volume chambers causes the piston 38 to move relative to the cylinder 40 along the length of the cylinder. Movement of the piston 38 along the length of the cylinder 40 causes corresponding axial movement of the piston rods 42 and 44. Axial movement of the piston rods 42 and 44, in turn, causes pivotal movement of the spindles 46 and 48 and wheels 18 and 20.

A pump 50 provides pressurized hydraulic fluid to the front steering motor 36. A front steering valve 52 controls flow of hydraulic fluid into and out of the variable volume chambers in the cylinder 40 of the front steering motor 36 and thereby controls operation of the front steering motor. The front steering valve 52 may include a moveable spool (not shown) to accomplish the hydraulic fluid flow control. A hydraulic fluid conduit 54 connects the pump 50 to the front steering valve 52. Two hydraulic fluid lines 56 connect the front steering valve 52 to the cylinder 40 and the variable volume chambers in the cylinder on opposite sides of the piston 38. The hydraulic fluid lines 56 permit hydraulic fluid to flow into and out of the cylinder 40 in accordance with the flow control established by the front steering valve 52. A return line 58 connects the front steering valve 52 to a hydraulic fluid reservoir 60. The return line 58 delivers hydraulic fluid flowing out of the cylinder 40 to the reservoir 60, which provides fluid to the pump 50.

The apparatus 10 further includes a rear steering motor 66 for turning the rear steerable wheels 22 and 24. The rear steering motor 66 is a hydraulic steering motor and includes a piston 68 disposed in and movable along the length of a cylinder 70. Piston rods 72 and 74 are connected to opposite sides or ends of the piston 68. The piston rods 72 and 74 extend through opposite ends of the cylinder 70 and are connected to spindles 76 and 78; respectively. Spindles 76 and 78, in turn, are connected to rear steerable wheels 22 and 24, respectively, such that the spindles pivot with the wheels about their respective pivot axes 30 and 32. The rear steering motor 66 is thus coupled to the rear steerable wheels 22 and 24 of the vehicle 12 to turn the rear steerable wheels.

Piston 68 effectively divides the interior of cylinder 70 into two variable volume chambers on opposite sides of the piston. Introducing pressurized hydraulic fluid into one of the variable volume chambers and permitting hydraulic fluid to flow out of the other of the variable volume chambers causes the piston 68 to move relative to the cylinder 70 along the length of the cylinder. Movement of the piston 68 along the length of the cylinder 70 causes corresponding axial movement of the piston rods 72 and 74. Axial movement of the piston rods 72 and 74, in turn, causes pivotal movement of the spindles 76 and 78 and wheels 22 and 24.

The pump 50 provides pressurized hydraulic fluid to the rear steering motor 66. A rear steering valve 82 controls flow of hydraulic fluid into and out of the variable volume chambers in the cylinder 70 of the rear steering motor 66 and, therefore, operation of the rear steering motor. The rear steering valve 82 may include a moveable spool (not shown) to accomplish the hydraulic fluid flow control. A hydraulic fluid conduit 84 connects the pump 50 to the rear steering valve 82. Two hydraulic fluid lines 86 connect the rear steering valve 82 to the cylinder 70 and the variable volume chambers in the cylinder on opposite sides of the piston 68. The hydraulic fluid lines 86 permit hydraulic fluid to flow into and out of the cylinder 70 in accordance with the flow control established by the rear steering valve 82. A return line 88 connects the rear steering valve 82 to the hydraulic fluid reservoir 60. The return line 88 delivers hydraulic fluid flowing out of the cylinder 70 to the reservoir 60.

A controller 90 is connected to the position sensor 34, the front steering valve 52, and the rear steering valve 82. The controller 90 is connected to the position sensor 34 via line 92 to receive position information indicative of the extent to which the steering wheel 14 is turned from a straight-ahead or neutral position, such as the angular position of the steering wheel relative to the neutral position. The controller 90 is connected to the front and rear steering valves 52 and 82 via lines 94 and 96, respectively, to control the steering valves and thus control the front and rear steering motors 36 and 66. As illustrated in FIG. 1, the lines 92, 94, and 96 provide electrical connections between the controller 90 and the position sensor 34 and the front and rear steering valves 52 and 82. Other types of connections may be used, however, to receive position information and transmit control instructions.

The controller 90 may be a microcomputer programmed to execute a control process, including one or more algorithms. The functions performed by the controller 90 could, however, be carried out by other digital and/or analog circuitry, including separate electrical or electronic components, which could be assembled on one or more circuit boards using discrete circuitry or fabricated as an application specific integrated circuit ("ASIC").

The controller 90 monitors the position output signal from the position sensor 34 and output signals from front and rear steering angle sensors (not shown), which indicate the angles of the front and rear wheels 18, 20, 22 and 24 relative to a straight-ahead or neutral position. The controller 90 executes one or more algorithms to determine whether the front and/or rear wheels 18, 20, 22 and 24 should be turned in response to the position signal from the position sensor 34.

The controller 90 determines the desired positions of the wheels 18, 20, 22 and 24 as a function of the position of the steering wheel 14. For example, the controller 90 may use algorithms or look-up tables to determine the desired positions of the wheels 18, 20, 22 and 24 from the position of the steering wheel 14. Using the output signals from the front and rear steering angle sensors (not shown), the controller 90 determines any differences between the desired positions and actual positions of the wheels 18, 20, 22 and 24. The controller then transmits control signals to one or both of the front and rear steering valves 52 and 82 to cause the actual positions of the wheels 18, 20, 22 and 24 to match the desired positions. The relationship between the position of the steering wheel 14 and the desired positions of the wheels 18, 20, 22 and 24 may be linear or non-linear and may vary with vehicle speed.

If the controller 90 determines that one or more of the wheels 18, 20, 22 and 24 should be turned in response to the position signal from the position sensor 34, the controller provides appropriate control signals to one or both of the front and rear steering valves 52 and 82. The control signals instruct one or both of the front and rear steering valves 52 and 82 to direct hydraulic fluid, as appropriate, into or out of the variable volume chambers in the steering motors 36 and 66, respectively, to move one or both of the pistons 38 and 68.

Alternatively, if the controller 90 determines that one or more of the wheels 18, 20, 22 and 24 should not be turned in response to the position signal from the position sensor 34, the controller provides appropriate control signals to one or both of the front and rear steering valves 52 and 82. The control signals instruct one or both of the front and rear steering valves 52 and 82 not to change the position of one or both of the pistons 38 and 68 of the steering motors 36 and 66.

In accordance with the invention, the controller 90 controls turning of the front wheels 18 and 20 and the rear wheels 22 and 24 in a sequential manner based on the position signal from the position sensor 34. In particular, the controller 90 instructs the front steering valve 52 to direct hydraulic fluid as required to cause the front steering motor 36 to provide all of the steering movement needed in response to rotation of the steering wheel 14 through a first portion of its range of rotation. While the steering wheel 14 is being rotated through the first portion of its range of rotation, the controller 90 instructs the rear steering valve 82 to direct hydraulic fluid as required to cause the rear steering motor 66 not to produce any steering movement of the rear wheels 22 and 24.

Similarly, in response to rotation of the steering wheel 14 through a second portion of its range of rotation, the controller 90 instructs the rear steering valve 82 to direct hydraulic fluid as required to cause the rear steering motor 66 to provide all of the steering movement needed. While the steering wheel 14 is being rotated through the second portion of its range of rotation, the controller 90 instructs the front steering valve 52 to direct hydraulic fluid as required to cause the front steering motor 36 not to produce any steering movement of the front wheels 18 and 20. The first and second portions of the range of rotation of the steering wheel 14 may be equal to each other or may be different from each other.

In one embodiment of the present invention, rotation of the steering wheel 14 through a first half of its range of rotational movement in each direction (i.e., clockwise and counter-clockwise) from a straight-ahead or neutral position produces turning of only the front wheels 18 and 20. Rotation of the steering wheel 14 through an immediately adjacent second half of its range of rotational movement in each direction from a straight-ahead or neutral position produces turning of only the rear wheels 22 and 24.

More particularly, if the steering wheel 14 has the capability of four full rotations of 360° in each direction (i.e., clockwise and counter-clockwise) from a straight-ahead or neutral position, two full rotations of 360° in each direction may be allocated to a front steering range and to a rear steering range. The controller 90 may thus allocate a front steering range of two full rotations of 360° (for a total of 720° of rotation) in each direction from the neutral position of the steering wheel 14 to steering of the front wheels 18 and 20. The controller 90 may also allocate a rear steering range of two full rotations of 360° (for a total of 720° of rotation) in each direction from the end of the front steering range of the steering wheel 14 to steering of the rear wheels 22 and 24.

Rotation of the steering wheel 14 within the front steering range, as detected by the position sensor 34, results in a corresponding position signal being transmitted to the controller 90. The controller 90 then transmits an appropriate control signal to the front steering valve 52. The control signal from the controller 90 causes the front steering valve 52 to direct hydraulic fluid to the front steering motor 36 by, for example, appropriate positioning of a valve spool internal to the steering valve. Pressurized hydraulic fluid flows into one of the variable volume chambers of the front steering cylinder 40. Hydraulic fluid flows out of the other of the variable volume chambers. The flow of hydraulic fluid moves the piston 38 and thereby produces pivotal movement of the front wheels 18 and 20 about their respective pivot axes 26 and 28. At the same time, the controller 90 either sends no control signal to the rear steering valve 82 or sends a control signal directing the rear steering valve to maintain the rear steering motor 66 in a neutral or straight-ahead steering orientation.

Correspondingly, rotation of the steering wheel 14 within the rear steering range, as detected by the position sensor 34, results in a corresponding position signal being transmitted to the controller 90. The controller 90 then transmits an appropriate control signal to the rear steering valve 82. The control signal from the controller 90 causes the rear steering valve 82 to direct hydraulic fluid to the rear steering motor 66 by, for example, appropriate positioning of a valve spool internal to the steering valve. Pressurized hydraulic fluid flows into one of the variable volume chambers of the rear steering cylinder 70. Hydraulic fluid flows out of the other of the variable volume chambers. The flow of hydraulic fluid moves the piston 68 and thereby produces pivotal movement of the rear wheels 22 and 24 about their respective pivot axes 30 and 32. To provide a smaller turning radius for the vehicle 12, the rear wheels 22 and 24 would be turned in a direction opposite the direction in which the front wheels 18 and 20 were turned.

At the same time, the controller 90 either sends no control signal to the front steering valve 52 or sends a control signal directing the front steering valve to maintain the front steering motor 36 in a fully-pivoted or turned steering orientation. Such a fully-pivoted or turned steering orientation of the front steering motor 36 and thus the front wheels 18 and 20 will have resulted from a control signal to the front steering valve 52 during rotation of the steering wheel 14 through its front steering range. Reverse rotation of the steering wheel 14 through the rear steering range and then through the front steering range will result in the foregoing steering process being reversed.

Steering the front wheels 18 and 20 and the rear wheels 22 and 24, respectively, in a sequential manner, as described above, requires the pump 50 to provide hydraulic fluid flow sufficient to supply the maximum fluid flow required by only a single hydraulic steering motor 36 or 66. The pump 50 is not required to provide hydraulic fluid flow to move the pistons 38 and 68 of both steering motors 36 and 66 at the same time and, therefore, can have a more limited capacity than might otherwise be required. The pump 50 may, therefore, be smaller, lighter in weight, and/or less expensive than if it were required to provide hydraulic fluid flow to both steering motors 36 and 66 at the same time.

The apparatus 10 is a steer-by-wire system. The apparatus 10 has no mechanical connection between the steering wheel 14 and either the steering motors 36 and 66 or the steering valves 52 and 82. In order to provide feedback to the vehicle operator concerning the operation of the steering motors 36 and 66, an electric motor 98 may be provided to resist turning of the steering wheel 14. The electric motor 98 may be any suitable variable speed reversible electric motor.

The controller 90 may control the electric motor 98 via line 99 to provide a first level of resistance to turning of the steering wheel 14 in the first portion of its range of rotation and a second level of resistance to turning of the steering wheel 14 in the second portion of its range of rotation. The second level of resistance may be higher than the first level of resistance. The transition between the levels of resistance may also be somewhat abrupt or otherwise noticeable, rather than gradual. A noticeable transition will help to alert the vehicle operator to the transition between steering of the front wheels 18 and 20 of the vehicle 12 to steering of the rear wheels 22 and 24.

Figure 2:
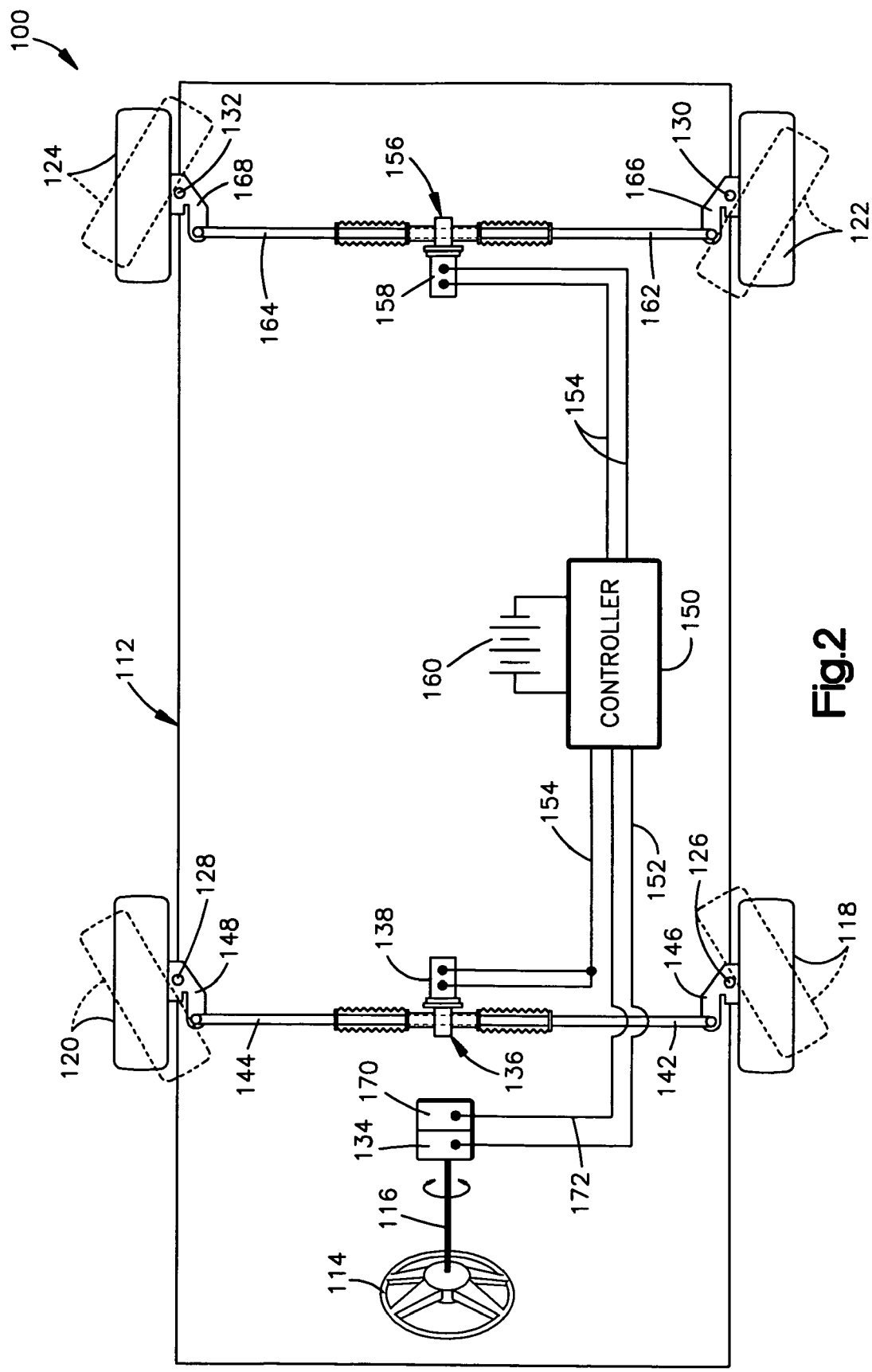
FIG. 2 is a schematic top view of a second embodiment of a steering apparatus embodying the present invention.

FIG. 2 of the drawings illustrates an apparatus lob in accordance with a second example embodiment of the present invention mounted in a vehicle 112. The vehicle 112 includes a hand wheel or steering wheel 114 mounted on a steering shaft 116. The steering wheel 114 can be manually rotated about the longitudinal axis of the steering shaft 116 by a vehicle operator to steer the vehicle 112.

The vehicle 112 also includes four road-engaging wheels 118, 120, 122 and 124. Wheels 118 and 120 are front wheels of the vehicle 112, and wheels 122 and 124 are rear wheels of the vehicle. At least one of the front wheels 118 and 120 and at least one of the rear wheels 122 and 124 is steerable. As shown in FIG. 2, all of the wheels 118, 120, 122 and 124 are steerable. Rotation of the steering wheel 114 causes the steerable wheels 118, 120, 122 and 124, via the apparatus 100, to pivot about respective pivot axes 126, 128, 130 and 132 and thereby change a direction in which the vehicle 112 is traveling.

The apparatus 100 translates rotation of the steering wheel 114 into pivotal movement of the steerable wheels 118, 120, 122 and 124 to change the direction of vehicle travel. The apparatus 100 includes a position sensor 134 for sensing the position of the steering wheel 114 relative to a straight-ahead or neutral position in which the steerable wheels 118, 120, 122 and 124 are oriented to cause the vehicle to travel straight ahead. The position sensor 134 provides a position output signal indicative of the extent to which the steering wheel 114 is turned from a straight-ahead or neutral position, such as the angular position of the steering wheel relative to the neutral position. The position sensor 134 may be any suitable known sensor.

The apparatus 100 also includes a front steering gear 136 for turning the front steerable wheels 118 and 120. The front steering gear 136 is an electric rack-and-pinion steering gear, which includes a longitudinally moveable rack (not shown) driven by a rotatable pinion gear (not shown). A front electric motor 138 is connected to and extends coaxially with the pinion gear. When actuated, the front electric motor 138 causes rotation of the pinion gear about the common axis of the electric motor and the pinion gear. Rotation of the pinion gear causes longitudinal movement of the rack relative to the pinion gear and the electric motor 138.

The longitudinally opposite ends of the rack either constitute or are attached to rods 142 and 144. The rods 142 and 144 are connected to spindles 146 and 148, respectively. Spindles 146 and 148, in turn, are connected to front steerable wheels 118 and 120, respectively, such that the spindles pivot with the wheels about their respective pivot axes 126 and 128. Longitudinal movement of the rack causes corresponding longitudinal or axial movement of the rods 142 and 144. Axial movement of the rods 142 and 144, in turn, causes pivotal movement of the spindles 146 and 148 and wheels 118 and 120. The front steering gear 136 and the front electric motor 138 are thus coupled to the front steerable wheels 118 and 120 of the vehicle 112 to turn the front steerable wheels.

The apparatus 100 also includes a rear steering gear 156 for turning the rear steerable wheels 122 and 124. The rear steering gear 156 is an electric rack-and-pinion steering gear, which includes a longitudinally moveable rack (not shown) driven by a rotatable pinion gear (not shown). A rear electric motor 158 is connected to and extends coaxially with the pinion gear. When actuated, the rear electric motor 158 causes rotation of the pinion gear about the common axis of the rear electric motor and the pinion gear. Rotation of the pinion gear causes longitudinal movement of the rack relative to the pinion gear and the rear electric motor 158.

The longitudinally opposite ends of the rack either constitute or are attached to rods 162 and 164. The rods 162 and 164 are connected to spindles 166 and 168, respectively. Spindles 166 and 168, in turn, are connected to rear steerable wheels 122 and 124, respectively, such that the spindles pivot with the wheels about their respective pivot axes 130 and 132. Longitudinal movement of the rack causes corresponding longitudinal or axial movement of the rods 162 and 164. Axial movement of the rods 162 and 164, in turn, causes pivotal movement of the spindles 166 and 168 and wheels 122 and 124. The rear steering motor 156 and the rear electric motor 158 are thus coupled to the rear steerable wheels 118 and 120 of the vehicle 112 to turn the rear steerable wheels.

A controller 150 is connected to the position sensor 134, the front electric motor 138 for the front steering gear 136, and the rear electric motor 158 for the rear steering gear 156. The controller 150 is connected to the position sensor 134 via line 152 to receive the position signal indicative of the extent to which the steering wheel 114 is turned from a straight-ahead or neutral position, such as the angular position of the steering wheel relative to the neutral position. The controller 150 is connected to the front and rear electric motors 138 and 158 for the front and rear steering gears 136 and 156, respectively, via lines 154, respectively, to control the electric motors. As illustrated in FIG. 2, the lines 152 and 154 provide electrical connections between the controller 150 and the position sensor 134 and the front and rear electric motors 138 and 158. Other types of connections may be used, however, to receive position information and transmit control instructions. The controller 150 is connected to a power source 160, such as a battery for the vehicle 112, which provides power for the controller and the front and rear electric motors 138 and 158.

The controller 150 may be a microcomputer programmed to execute a control process, including one or more algorithms. The functions performed by the controller 150 could, however, be carried out by other digital and/or analog circuitry, including separate electrical or electronic components, which could be assembled on one or more circuit boards using discrete circuitry or fabricated as an application specific integrated circuit ("ASIC").

The controller 150 monitors the position output signal from the position sensor 134 and output signals from front and rear steering angle sensors (not shown), which indicate the angles of the front and rear wheels 118, 120, 122 and 124 relative to a straight-ahead or neutral position. The controller 150 executes one or more algorithms to determine whether the front and/or rear wheels 118, 120, 122 and 124 should be turned in response to the position output signal from the position sensor 134.

The controller 150 determines the desired positions of the wheels 118, 120, 122 and 124 as a function of the position of the steering wheel 114. For example, the controller 150 may use algorithms or look-up tables to determine the desired positions of the wheels 118, 120, 122 and 124 from the position of the steering wheel 114. Using the output signals from the front and rear steering angle sensors (not shown), the controller 150 determines any differences between the desired positions and actual positions of the wheels 118, 120, 122 and 124. The controller then transmits control signals to one or both of the front and rear electric motors 138 and 158 to cause the actual positions of the wheels 118, 120, 122 and 124 to match the desired positions. The relationship between the position of the steering wheel 114 and the desired positions of the wheels 118, 120, 122 and 124 may be linear or non-linear and may vary with vehicle speed.

If the controller 150 determines that one or more of the wheels 118, 120, 122 and 124 should be turned in response to the position signal from the position sensor 134, the controller provides appropriate control signals to one or both the front and rear electric motors 138 and 158. The control signals instruct one or both of the front and rear electric motors 138 and 158 to rotate their respective pinion gears, as appropriate, in a clockwise or counter-clockwise direction to move one or both of the racks associated with the pinion gears. Alternatively, if the controller 150 determines that one or more of the wheels 118, 120, 122 and 124 should not be turned in response to the position signal from the position sensor 134, the controller provides appropriate control signals to one or both of the front and rear electric motors 138 and 158. The control signals instruct one or both of the front and rear electric motors 138 and 158 not to change the position of one or both of the racks of the steering gears 136 and 156.

In accordance with the invention, the controller 150 controls turning of the front wheels 118 and 120 and the rear wheels 122 and 124 in a sequential manner based on the position signal from the position sensor 134. In particular, the controller 150 instructs the front electric motor 138 to cause the front steering gear 136 to provide all of the steering movement needed in response to rotation of the steering wheel 114 through a first portion of its range of rotation. While the steering wheel 114 is being rotated through the first portion of its range of rotation, the controller 150 instructs the rear electric motor 158 to cause the rear steering gear 156 not to produce any steering movement of the rear wheels 122 and 124.

Similarly, in response to rotation of the steering wheel 114 through a second portion of its range of rotation, the controller 150 instructs the rear electric motor 158 to cause the rear steering gear 156 to provide all of the steering movement needed. While the steering wheel 114 is being rotated through the second portion of its range of rotation, the controller 150 instructs the front electric motor 138 to cause the front steering gear 136 not to produce any steering movement of the front wheels 118 and 120. The first and second portions of the range of rotation of the steering wheel 114 may be equal to each other or may be different from each other.

In one embodiment of the present invention, rotation of the steering wheel 114 through a first half of its range of rotational movement in each direction (i.e., clockwise and counter-clockwise) from a straight-ahead or neutral position produces only turning of the front wheels 118 and 120. Rotation of the steering wheel 114 through an immediately adjacent second half of its range of rotational movement in each direction from a straight-ahead or neutral position produces only turning of the rear wheels 122 and 124.

More particularly, if the steering wheel 114 has the capability of four full rotations of 360° in each direction (i.e., clockwise and counter-clockwise) from a straight-ahead or neutral position, two full rotations of 360° in each direction may be allocated to a front steering range and to a rear steering range. The controller 150 may thus allocate a front steering range of two full rotations of 360° (for a total of 720° of rotation) in each direction from the neutral position of the steering wheel 114 to steering of the front wheels 118 and 120. The controller 150 may also allocate a rear steering range of two full rotations of 360° (for a total of 720° of rotation) in each direction from the end of the front steering range of the steering wheel 114 to steering of the rear wheels 122 and 124.

Rotation of the steering wheel 114 within the front steering range, as detected by the position sensor 134, results in a corresponding position signal being transmitted to the controller 150. The controller 150 then transmits an appropriate control signal to the front electric motor 138. The control signal from the controller 150 causes the front electric motor 138 to rotate the pinion gear of the front steering gear 136 in a clockwise or counter-clockwise direction, as appropriate. Rotation of the pinion gear causes longitudinal movement of the rack of the front steering gear 136, which moves the rods 142 and 144 and thereby produces pivotal movement of the front wheels 118 and 120 about their respective pivot axes 126 and 128. At the same time, the controller 150 either sends no control signal to the rear electric motor 158 or sends a control signal directing the rear electric motor to maintain the rear steering gear 156 in a neutral or straight-ahead steering orientation.

Correspondingly, rotation of the steering wheel 114 within the rear steering range, as detected by the position sensor 134, results in a corresponding position signal being transmitted to the controller 150. The controller 150 then transmits an appropriate control signal to the rear electric motor 158. The control signal from the controller 150 causes the rear electric motor 158 to rotate the pinion gear of the rear steering gear 156 in a clockwise or counter-clockwise direction, as appropriate. Rotation of the pinion gear causes longitudinal movement of the rack of the rear steering gear 156, which moves the rods 162 and 164 and thereby produces pivotal movement of the rear wheels 122 and 124 about their respective pivot axes 130 and 132. To provide a smaller turning radius for the vehicle 112, the rear wheels 122 and 124 would be turned in a direction opposite the direction in which the front wheels 118 and 120 were turned.

At the same time, the controller 150 either sends no control signal to the front electric motor 138 or sends a control signal directing the front rear electric motor to maintain the front steering gear 136 in a fully-pivoted or turned steering orientation. Such a fully-pivoted or turned steering orientation of the front steering gear 136 and thus the front wheels 118 and 120 will have resulted from a control signal to the front electric motor 138 during rotation of the steering wheel 114 through its front steering range. Reverse rotation of the steering wheel 114 through the rear steering range and then through the front steering range will result in the foregoing steering process being reversed.

The apparatus 100 is a steer-by-wire system. The apparatus 100 has no mechanical connection between the steering wheel 114 and either the steering gears 136 and 156 or the electric motors 138 and 158. In order to provide feedback to the vehicle operator concerning the operation of the steering gears 136 and 156, an electric motor 170 may be provided to resist turning of the steering wheel 114. The electric motor 170 may be any suitable variable speed reversible electric motor.

The controller 150 may control the electric motor 170 via line 172 to provide a first level of resistance to turning of the steering wheel 114 in the first portion of its range of rotation and a second level of resistance to turning of the steering wheel in the second portion of its range of rotation. The second level of resistance may be higher than the first level of resistance. The transition between the levels of resistance may also be somewhat abrupt or otherwise noticeable, rather than gradual. A noticeable transition will help to alert the vehicle operator to the transition between steering of the front wheels 118 and 120 of the vehicle 112 to steering of the rear wheels 122 and 124.

Although the steering gears 136 and 156 of FIG. 2 are shown and described as electrically-powered and electrically-controlled steering gears, each gear may be of any suitable construction. Thus, for example, either one or both of the steering gears may be an electrically-controlled integral hydraulic steering gear, which includes a hydraulic motor and a hydraulic control valve for controlling the hydraulic motor, as is known in the art. Similarly, although the front and rear steering motors 36 and 66 of FIG. 1 are shown and described as being separate from the front and rear steering valves 52 and 82, the steering motors and their respective steering valves may be combined into a front steering gear and a rear steering gear.

Also, while controllers 90 and 150 are described as microcomputers, they may employ or incorporate electrical, electro-mechanical, mechanical or hydraulic components to execute portions of the control process, such as one or more hydraulic circuits to transmit control signals to front and rear steering valves 52 and 82.

In view of the description above, those skilled in the art may become aware of or perceive improvements, changes and modifications which may be made in the present invention. Such improvements, changes, and/or modifications within the skill of the art are intended to be covered by the appended claims.

Having described the invention, the following is claimed:

1. An apparatus for use in turning steerable wheels of a vehicle upon manual rotation of a steering wheel, said apparatus comprising:
  a front steering motor coupled to a front steerable wheel of the vehicle for turning the front steerable wheel;
  a rear steering motor coupled to a rear steerable wheel of the vehicle for turning the rear steerable wheel;
  a position sensor for sensing a rotational position of the steering wheel and providing an output indicative of said rotational position; and
  a controller for receiving the output of the position sensor and controlling the front and rear steering motors to turn only the front steerable wheel in response to the output from the position sensor indicating rotation of the steering wheel in a first portion of a range of rotation of the steering wheel and to turn only the rear steerable wheel in response to the output from the position sensor indicating rotation of the steering wheel in a second portion of the range of rotation of the steering wheel.

2. The apparatus of claim 1 wherein the first and second portions of the range of rotation of the steering wheel in each rotational direction from a straight-ahead position of the steering wheel are immediately adjacent to one another.

3. The apparatus of claim 1 wherein the first and second steering motors are hydraulic steering motors and said apparatus further comprises:
  a front steering valve for controlling flow of hydraulic fluid to the front steering motor; and
  a rear steering valve for controlling flow hydraulic fluid to the rear steering motor;
  the controller controlling the front and rear hydraulic motors by controlling the front and rear steering valves.

4. The apparatus of claim 3 wherein the front steering motor and the front steering valve are portions of a hydraulic front steering gear and the rear steering motor and the rear steering valve are portions of a hydraulic rear steering gear.

5. An apparatus for use in turning steerable wheels of a vehicle upon manual rotation of a steering wheel, said apparatus comprising:
  a front steering gear coupled to a front steerable wheel of the vehicle for turning the front steerable wheel;
  a rear steering gear coupled to a rear steerable wheel of the vehicle for turning the rear steerable wheel;
  a position sensor for sensing a rotational position of the steering wheel and providing an output indicative of said rotational position; and
  a controller for receiving the output of the position sensor and controlling the front and rear steering gears to turn only the front steerable wheel in response to the output from the position sensor indicating rotation of the steering wheel in a first portion of a range of rotation of the steering wheel and to turn only the rear steerable wheel in response to the output from the position sensor indicating rotation of the steering wheel in a second portion of the range of rotation of the steering wheel.

6. The apparatus of claim 5 wherein the first and second portions of the range of rotation of the steering wheel in each rotational direction from a straight-ahead position of the steering wheel are immediately adjacent to one another.

7. The apparatus of claim 5 wherein each of the front and rear steering gears comprises an electrically controlled and electrically powered steering gear.

8. A method for turning at least one front steerable wheel and at least one rear steerable wheel of a vehicle upon manual rotation of a steering wheel, said method comprising the steps of:
  sensing a rotational position of the steering wheel and providing a position output indicative of the rotational position;
  turning the at least one front steerable wheel in response to the position output indicating rotation of the steering wheel in a first portion of a range of rotation of the steering wheel; and
  turning only the at least one rear steerable wheel in response to the position output indicating rotation of the steering wheel in a second portion of the range of rotation of the steering wheel.

9. The method of claim 8 wherein the step of turning the at least one front steerable wheel in response to the position output indicating rotation of the steering wheel in a first portion of a range of rotation of the steering wheel controller comprises turning only the at least one front steerable wheel in response to the position output.

10. The method of claim 9 wherein the first and second portions of the range of rotation of the steering wheel in each rotational direction from a straight-ahead position of the steering wheel are immediately adjacent to one another.

* * * * *